United States Patent
Schachter et al.

(10) Patent No.: US 9,598,011 B2
(45) Date of Patent: Mar. 21, 2017

(54) ARTIFICIAL VISION SYSTEM

(71) Applicants: Bruce J. Schachter, Clarksville, MD (US); Dustin D. Baumgartner, Ellicott City, MD (US)

(72) Inventors: Bruce J. Schachter, Clarksville, MD (US); Dustin D. Baumgartner, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 453 days.

(21) Appl. No.: 14/151,569

(22) Filed: Jan. 9, 2014

(65) Prior Publication Data
US 2015/0193917 A1  Jul. 9, 2015

(51) Int. Cl.
*H04N 5/33* (2006.01)
*B60R 1/00* (2006.01)
(Continued)

(52) U.S. Cl.
CPC .............. *B60R 1/00* (2013.01); *G06K 9/6289* (2013.01); *G06T 5/009* (2013.01); *G06T 5/10* (2013.01); *H04N 5/33* (2013.01); *B60R 2300/80* (2013.01); *G06K 2009/6295* (2013.01); *G06T 2207/10048* (2013.01); *G06T 2207/20064* (2013.01)

(58) Field of Classification Search
CPC . G06T 2207/20064; G06T 2207/10048; G06T 5/009; G06T 5/10; B60R 1/00; B60R 2300/80; G06K 2009/6295; G06K 9/6289; H04N 5/33
See application file for complete search history.

(56) References Cited

U.S. PATENT DOCUMENTS 8,019,490 B2   9/2011   Ferren et al.
8,023,760 B1   9/2011   Buck et al.
(Continued)

FOREIGN PATENT DOCUMENTS

EP   0727874 A1   8/1996
WO   2007038721 A2   4/2007

OTHER PUBLICATIONS

International Search Report and Written Opinion for PCT/US2014/065719, mailed Mar. 5 2015, pp. 1-12.
(Continued)

*Primary Examiner* — Mohammed Rahaman
(74) *Attorney, Agent, or Firm* — Tarolli, Sundheim, Covell & Tummino LLP

(57) ABSTRACT

One aspect of the present invention includes artificial vision system. The system includes an image system comprising a video source that is configured to capture sequential frames of image data of non-visible light and at least one processor configured as an image processing system. The image processing system includes a wavelet enhancement component configured to normalize each pixel of each of the sequential frames of image data and to decompose the normalized image data into a plurality of wavelet frequency bands. The image processing system also includes a video processor configured to convert the plurality of wavelet frequency bands in the sequential frames into respective visible color images. The system also includes a video display system configured to display the visible color images.

18 Claims, 3 Drawing Sheets

(51) Int. Cl.
    *G06K 9/62*    (2006.01)
    *G06T 5/00*    (2006.01)
    *G06T 5/10*    (2006.01)

(56) References Cited

U.S. PATENT DOCUMENTS

| | | |
|---|---|---|
| 8,149,245 B1 | 4/2012 | Buck et al. |
| 2009/0058873 A1* | 3/2009 | Brown Elliott ......... G06T 5/009 345/589 |
| 2010/0165111 A1* | 7/2010 | Gorian ............... G06K 9/00771 348/164 |
| 2010/0290703 A1* | 11/2010 | Sim .................. G06T 5/008 382/172 |
| 2012/0128076 A1 | 5/2012 | Sartor et al. |
| 2012/0249827 A1 | 10/2012 | Wootton et al. |
| 2013/0308697 A1 | 11/2013 | Fukuhara |
| 2014/0240512 A1* | 8/2014 | Hogasten ............. H04N 5/2257 348/164 |

OTHER PUBLICATIONS

Baumgartner, et al: U.S. Appl. No. 14/041,849, filed Sep. 30, 2013, entitled "Platform-Mounted Artificial Vision System".
Klein, et al.: "*Use of 3D Conformal Symbology on HMD for a Safer Flight in Degraded Visual Environment*"; pp. 1-10.
Nohara, et al.: "*An Accurate Algorithm for Color to Gray and Back*", ICIP 2009, IEEE, pp. 485-488.
Wang, et al.: "*Study of the Pseudo-Color Processing for Infrared Forest-Fire Image*", 2010 2nd International Conference on Future Computer and Communication, vol. 1, IEEE 2010, pp. V1-415-V1-418.

* cited by examiner

ARTIFICIAL VISION SYSTEM

TECHNICAL FIELD

The present invention relates generally to vision systems, and specifically to an artificial vision system.

BACKGROUND

Artificial vision systems can be implemented for a variety of reasons. As an example, an artificial vision system can be mounted on a stationary platform and can be implemented for security measures. As another example, an artificial vision system can be mounted on a moving platform (e.g., an aircraft), such as to assist a pilot in navigation of the moving platform. As an example, both military and commercial rotorcraft survivability is significantly impacted while operating in a degraded visual environment (DVE). Common degraded visual conditions affecting rotorcraft, for example, include brownout (sand in atmosphere), whiteout (snow in atmosphere), smoke, rain, mist, fog, ocean spray, turbulence, darkness, and helicopter rotor blade obstruction. Such degraded visual conditions can result in a crash of the moving platform as the pilot's vision is obscured by the degraded visual condition. As an example, landing a helicopter in brownout conditions can be particularly perilous.

SUMMARY

One aspect of the present invention includes artificial vision system. The system includes an image system comprising a video source that is configured to capture sequential frames of image data of non-visible light and at least one processor configured as an image processing system. The image processing system includes a wavelet enhancement component configured to normalize each pixel of each of the sequential frames of image data and to decompose the normalized image data into a plurality of wavelet frequency bands. The image processing system also includes a video processor configured to convert the plurality of wavelet frequency bands in the sequential frames into respective visible color images. The system also includes a video display system configured to display the visible color images.

Another aspect of the present invention includes a method for converting monochromatic infrared (IR) image data into a visible image in an artificial vision system. The method includes capturing sequential frames of IR image data via an IR video source and normalizing each pixel of each of the sequential frames of IR image data. The method also includes decomposing each of the normalized sequential frames of IR image data into a plurality of wavelet frequency bands corresponding to respective RGB color space signals. The method further includes combining the RGB color space signals at a video display system to provide visible color images associated with each of the respective sequential frames of monochromatic IR image data.

Another embodiment includes an artificial vision system mounted on a moving platform. The system includes a self-enclosed image system. The self-enclosed image system includes an infrared IR video source that is configured to capture a plurality of sequential frames of IR image data. The self-enclosed image system further also includes at least one processor configured as an image processing system configured to calculate situational awareness (SA) data based on the processed sequential frames of IR data. The image processing system includes a wavelet enhancement component configured to process the sequential frames of IR image data to normalize each pixel of each of the sequential frames of IR image data and to decompose the normalized sequential frames of IR image data into a plurality of wavelet frequency bands. The image processing system also includes a video processor to convert the plurality of wavelet frequency bands in the sequential frames of IR image data into respective visible color images. The system further includes a video display system configured to display the visible color images and to visibly identify the SA data relative to the moving platform on each of the visible color images.

DETAILED DESCRIPTION

Figure 1:
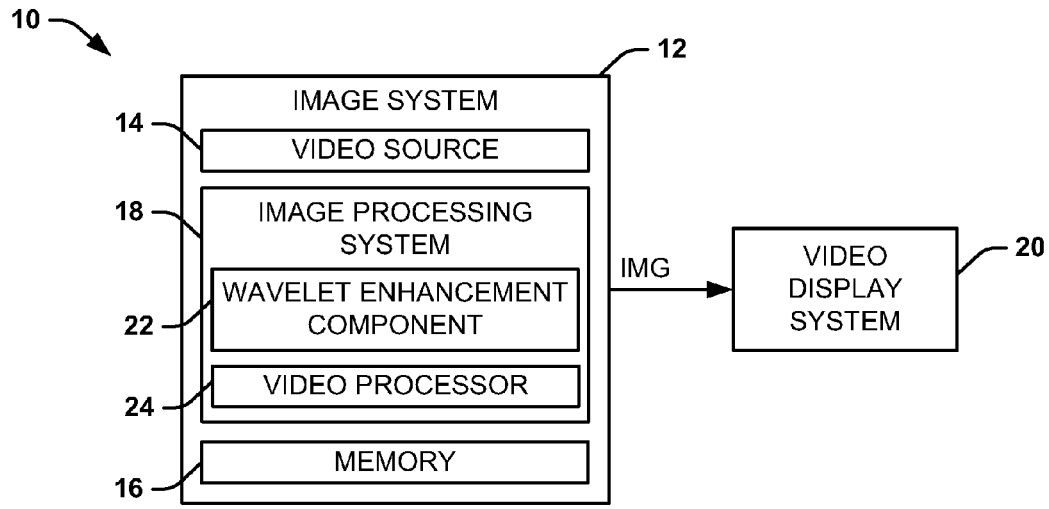
FIG. 1 illustrates an example of an artificial vision system.

The present invention relates generally to vision systems, and specifically to an artificial vision system. The artificial vision system can be mounted, for example, on a moving platform, such as an aircraft (e.g., helicopter). The artificial vision system includes an image system, which can be a self-contained image system (e.g., image system package). The image system includes a video source, which can be configured as a forward-looking infrared (FLIR) video source, that is configured to captures a plurality of sequential frames of image data. As described herein, the term "artificial vision system" refers to a vision system that provides processed video images of a scene that can be viewed by a user in lieu of or in addition to the user's own unaided vision. The image system also includes one or more processors configured as an image processing system. The image processing system is configured to process the sequential frames to normalize each pixel of each of the sequential frames of image data individually, to decompose the normalized image data into a plurality of wavelet frequency bands, and to convert the plurality of wavelet frequency bands in the sequential frames into respective visible color images.

As an example, the image processing system can include a wavelet enhancement component and a video processor. The wavelet enhancement component can include a pre-processing stage configured to analyze each of the sequential frames of image data with respect to a dynamic range and distribution of grayscale values. The pre-processing stage can also implement noise suppression to substantially mitigate noise in each of the sequential frames of IR image data based on the analysis. The pre-processing stage can also provide the normalization of each pixel of each of the sequential frames of image data on a row-by-row basis based on the analysis. The wavelet enhancement component can also include a wavelet decomposition stage that can include a plurality of difference-of-Gaussian (DoG) or other similar types of filters configured to decompose the normalized image data into a plurality of wavelet frequency bands corresponding to different respective amounts of visual detail associated with each of the sequential frames of image data. The plurality of wavelet bands can thus each correspond to respective color space signals, such as RGB signals. As an example, the color space signals can be provided as having pixel values that are high dynamic range floating point values.

The video processor includes a plurality of non-linear mapping components. Each of the plurality of non-linear mapping components can include a ramp function configured to simulate atmospheric attenuation. Each image that can correspond to a respective one of the respective plurality of wavelet frequency bands can be subject to a different ramp function. As an example, the atmosphere can attenuate the red component of a visual scene more severely as a function of range than the blue component. The non-linear mapping components can also each include a sigmoid component configured to down-convert the ramp processed one of the wavelet frequency bands integer color space signals, such as RGB signals that can be provided to a color video display. As an example, the sigmoid component can down-convert the ramp processed one of the wavelet bands from the high dynamic range floating point values associated with each pixel (e.g., 64-bit or 32-bit floating point value) to lesser bit-length integer values associated with each pixel (e.g., 8 bits).

In addition, the image processing system can be configured to process the sequential frames with minimum lag, such as to provide stabilization of the sequential frames and/or to calculate situational awareness (SA) data associated with the sequential frames relative to the platform. The image processing system can also be configured to provide lucky region image processing, such as to enhance the sequential frames with respect to environment-based occlusion of the video source, such as based on a degraded visual environment (DVE), based on recursively processing consecutive stabilized images of the sequential frames. The enhancement can be based on inertial data associated with the platform (i.e., a moving platform), such as generated by an inertial measurement unit (IMU) that is included within the self-contained image system. The image system can also convert the sequential frames to visible images, such that the visible images can be displayed on a video display system, such as to assist a pilot in navigation and pilotage of the platform (i.e., moving platform).

FIG. 1 illustrates an example of an artificial vision system 10. The artificial vision system 10 can be mounted on a platform. As an example, the platform can be a stationary platform, such that the artificial vision system 10 can be implemented for security purposes. As another example, the artificial vision system 10 can be mounted on a moving platform, such as an aircraft (e.g., a helicopter), to assist an associated pilot in navigation or pilotage of the moving platform, such as in a degraded visual environment (DVE), such as for the purpose of landing the aircraft.

The artificial vision system 10 includes an image system 12 that can be configured as a self-contained package. In the example of FIG. 1, the image system 12 includes a video source 14 that is configured to capture a plurality of sequential frames of an environment scene. For example, the video source 14 can be configured as an infrared (IR) video source, such that the sequential IR images are sequential frames. As an example, the image system 12 can be mounted on at least one location of the moving platform, such as on the nose of a helicopter, such that the video source 14 captures the sequential frames from approximately the same perspective as the pilot of the moving platform. As an example, the image system 12 can also include an inertial measurement unit (IMU) that is configured to generate inertial data associated with the sensor within the moving platform, such as movement in six-degrees of motion (e.g., angular yaw, pitch, roll, and vector linear motion in three-dimensions).

The image system 12 also includes a memory 16 and an image processing system 18 that can be configured as one or more processors. The memory 16 can be configured to store the instructions that implement the image processing system 18 (e.g., via one or more associated processor(s)), and can be implemented to buffer one or more sequential frames captured by the video source 14 and the processing thereof. The image processing system 18 is configured to process the sequential frames and to provide the processed sequential frames as visible video data IMG to a video display system 20. As an example, the video display system 20 can be configured as a video monitor that provides visible images to a user to view the environment scene, such as to assist a pilot in navigating the moving platform.

In the example of FIG. 1, the image processing system 18 includes a wavelet enhancement component 22 and a video processor 24. The wavelet enhancement component 22 is configured to process the sequential frames of image data to normalize the pixels of each frame of the image data individually and to decompose the frames of image data into a plurality of wavelet frequency bands. As an example, the wavelet enhancement component 22 can include a pre-processing stage that can implement image analysis of each of the frames of image data with respect to dynamic range and distribution of grayscale values of each of the frames, noise suppression, and row-by-row normalization of the grayscale values based on the analysis. The wavelet enhancement component 22 can, as another example, include a wavelet decomposition stage configured to implement a plurality of digital filtering techniques to separate the image data into the separate wavelet bands that are each associated with different levels of image detail. Each of the separate wavelet bands can thus be associated with separate color space signals, such as RGB color space signals. The video processor 24 is configured to process the wavelet bands to convert the wavelet bands into the image signal IMG. As an example, the video processor 24 can include non-linear mapping components that are configured to implement ramp functions to simulate atmospheric attenuation of the separate wavelet bands and sigmoid components to down-convert the wavelet bands to generate the image signal IMG (e.g., from high dynamic range floating point values to integer values associated with each pixel). Thus, the video processor 24 can provide the processed RGB color space signals as the image signal IMG to the video display system 20.

Figure 2:
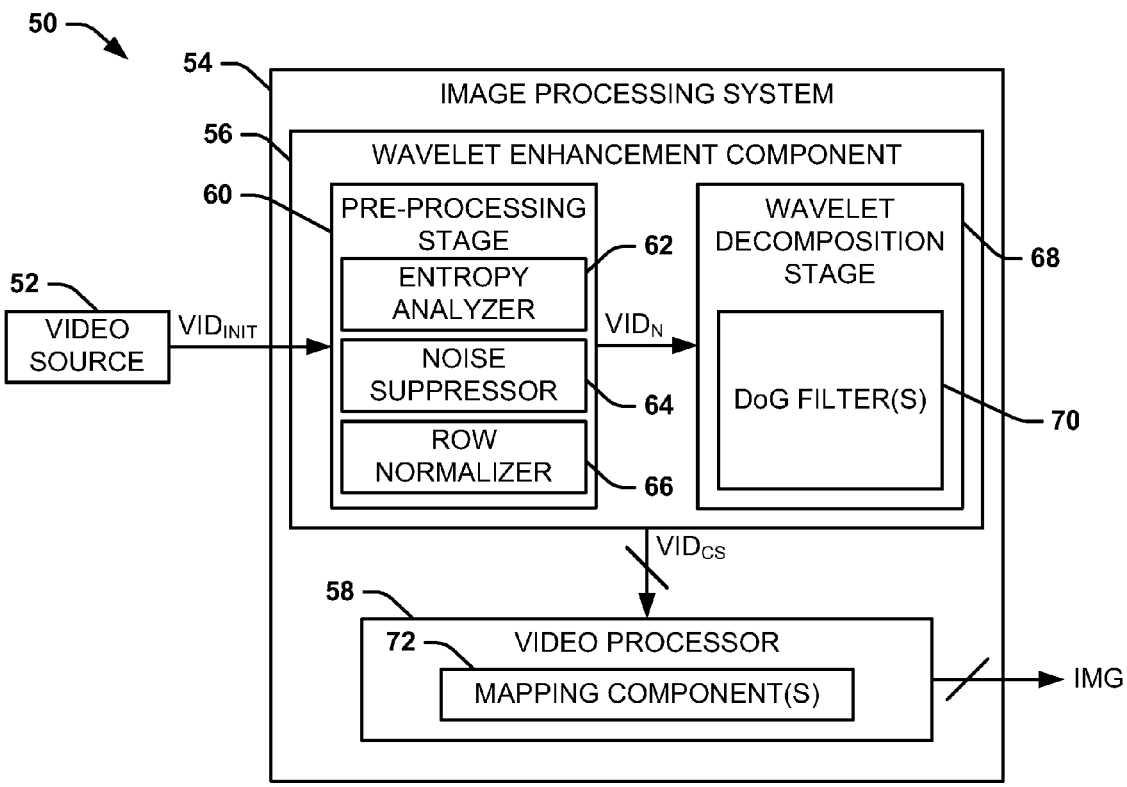
FIG. 2 illustrates an example of an image system.

FIG. 2 illustrates an example of an image system 50. The image system 50 can correspond to the image system 12 in the example of FIG. 1. Therefore, the image system 50 can be implemented as a self-contained unit mounted on a platform, such as a moving platform, to capture sequential frames of an environment scene and provide visible video data IMG to a video display system (e.g., the video display system 20). Thus, the image system 50 can provide artificial vision for a user, such as a pilot of the moving platform.

The image system 50 includes an IR video source 52, such as a forward looking infrared (FLIR) video source, that is configured to capture a plurality of sequential IR frames of image data of the environment scene. In the example of FIG. 2, the video source 52 generates image data $VID_{INIT}$ that can correspond to fourteen-bits per pixel IR monochromatic image data provided at sixty frames per second (fps). As an example, other infrared cameras may produce imagery at other frame rates and bit depths. The image data $VID_{INIT}$ is provided to an image processing system 54. The image processing system 54 can be configured as a set of software modules that are executed by one or more processors, such as in a system-on-chip (SOC) or field programmable gate array (FPGA) arrangement in the self-contained image system 50. As an example, the image processing system 54 can be configured as part of the video source 52, such as contained on the SOC or FPGA arrangement within the video source 52.

In the example of FIG. 2, the image processing system 54 includes a wavelet enhancement component 56 and a video processor 58. The wavelet enhancement component 56 includes a pre-processing stage 60 and a wavelet decomposition stage 62. The image data $VID_{INIT}$ is provided to the pre-processing stage 60, such that the pre-processing stage 60 can implement pre-processing on each of the sequential frames of the image data $VID_{INIT}$ individually. The pre-processing can include analysis of the grayscale pixels in each of the sequential frames and normalization of the pixels based on the analysis. The pre-processing stage 60 can thus provide normalized frames of image data to the wavelet decomposition stage 62, demonstrated in the example of FIG. 2 as a signal $VID_N$.

In the example of FIG. 2, the pre-processing stage 60 includes an entropy analyzer 64, a noise suppressor 66, and a row normalizer 68. The sequential frames of the image data $VID_{INIT}$ are provided first to the entropy analyzer 64 for the grayscale analysis of the sequential frames of the image data $VID_{INIT}$ with respect to grayscale distribution and dynamic range, which can be characterized by normalized entropy $N_E$. As an example, the entropy analyzer 64 is configured to compute the normalized entropy $N_E$ of each of the sequential frames of the image data $VID_{INIT}$, such as follows:

$$N_E = E\{-p(i)\text{Log}_2[p(i)]\} \qquad \text{Equation 1}$$

Where:
  i denotes a given one of the sequential frames of the image data $VID_{INIT}$;
  p denotes a probability density of grayscale value; and
  E denotes an expected value.

The entropy analyzer 64 can thus evaluate the normalized entropy $N_E$ of each of the sequential images of the image data $VID_{INIT}$ relative to a preset value t. If the normalized entropy $N_E$ exceeds the preset value t, the image is characterized as having high entropy. Conversely, if the normalized entropy $N_E$ is lower or equal to the preset value t, the image is characterized as having low entropy.

The noise suppressor 66 is configured to provide a noise suppression algorithm based on the determined normalized entropy $N_E$. The noise suppression algorithm can be configured to substantially mitigate noise in each of the sequential frames of image data based on the determined normalized entropy $N_E$. As an example, the noise suppressor 66 can be configured to convolve a given frame of the image data that is determined as a high entropy image with a two-dimensional Gaussian function $G_{HIGH}$ that can be associated with a radius of a Gaussian distribution. As an example, the two-dimensional Gaussian function $G_{HIGH}$ can have a radius of approximately 0.5 with respect to a pixel of the respective image frame. Similarly, the noise suppressor 66 can be configured to convolve a given frame of the image data that is determined as a low entropy image with a two-dimensional Gaussian function $G_{LOW}$. As an example, the two-dimensional Gaussian function $G_{LOW}$ can have a radius of approximately 1.0 with respect to a pixel of the respective image frame.

The row normalizer 68 can be configured to provide normalization of the pixels of the noise-suppressed image frame based on the analysis provided by the entropy analyzer 64. As an example, the row normalizer 68 can be configured to normalize each row of the grayscale image frame to have a grayscale value that is closer to a middle grayscale value (e.g., a median or a mean grayscale value) allowed by a respective bit-depth of the respective image frame. For example, a current grayscale mean value (m) can be changed to a new mean grayscale value (m') that can be between the current image row grayscale mean (m) and a value of q, which can correspond to the middle grayscale value for the given bit-depth. As an example, for a 10-bit image frame having 1024 allowable grayscale values, the value of q can be 512. An example of the calculation of the new mean grayscale value (m') is as follows:

$$m' = c*m + (1 \times c)*q \qquad \text{Equation 2}$$

Where:
  c is a tunable predetermined constant with a value $0 < c < 1$.

The row normalizer 68 can thus set the grayscale values across the given image frame closer to an ambient scene, such that a given scene in the image frame does not have a very large global disparity in grayscale value (e.g., dynamic range) between features in the scene and ambient temperatures. Accordingly, the row normalizer 68 can normalize the grayscale values row-by-row (e.g., from top to bottom) in the given image frame to generate a normalized image frame, demonstrated in the example of FIG. 2 as a signal $VID_N$.

The normalized image frame $VID_N$ is provided to the wavelet decomposition stage 62. The wavelet decomposition stage 62 comprises at least one difference-of-Gaussian (DoG) filter 70 configured to decompose the normalized image frame $VID_N$ into one or more wavelet bands having distinct bandpass characteristics, such as corresponding to different levels of image detail. For example, each of the DoG filters 70 can correspond to a bandpass filter having different Gaussian dimensions (e.g., circular radii or elliptical axes). Thus, each of the wavelet decompositions can correspond to different frequency bands associated with a different level of detail of the image frame (e.g., highly detailed portions of the image frame to low detail portions of the image frame). Accordingly, each of the wavelet bands can correspond to a separate color space signal (e.g., separate respective channels of the RGB color signals). The wavelet signal(s) are provided from the wavelet decomposition stage 62, and thus the wavelet enhancement component 56 as wavelet decomposed signal(s) $VID_{CS}$. While the example of FIG. 2 demonstrates the use of DoG filter(s) 70, it is to be understood that a variety of similar filters could instead be implemented.

The wavelet decomposed signal(s) $VID_{CS}$ are provided to the video processor 58. The video processor 58 is demonstrated in the example of FIG. 2 as including one or more non-linear mapping components 72. As an example, each of the one or more mapping components 72 can correspond to a respective one of the DoG filters 70 in the wavelet decomposition stage 62, and thus to a respective one of the wavelet decomposed signals $VID_{CS}$. Each of the mapping components 72 is configured to process the respective one of the wavelet decomposed signals $VID_{CS}$ to construct a channel of the color video image via the video display system 20. As an example, each of the mapping component(s) 72 can include a ramp function and a sigmoid component that can process the respective one of the wavelet decomposed signals VID$_{CS}$ to distribute the pixels associated with respective frequency band across the resultant image (e.g., from top to bottom), such as to simulate atmospheric attenuation with respect to a given color frequency band, and to down-convert the processed video, such as from a high-dynamic range floating point value to an integer value for each associated pixel. As an example, the video processor 58 can include three mapping components 72 to represent the three respective wavelet bands as a red color space signal, a green color space signal, and a blue color space signal to be provided to the video display system 20. The processed wavelet band(s) are demonstrated as being provided from the video processor 58 in the example of FIG. 2 as the image signal IMG.

Figure 3:
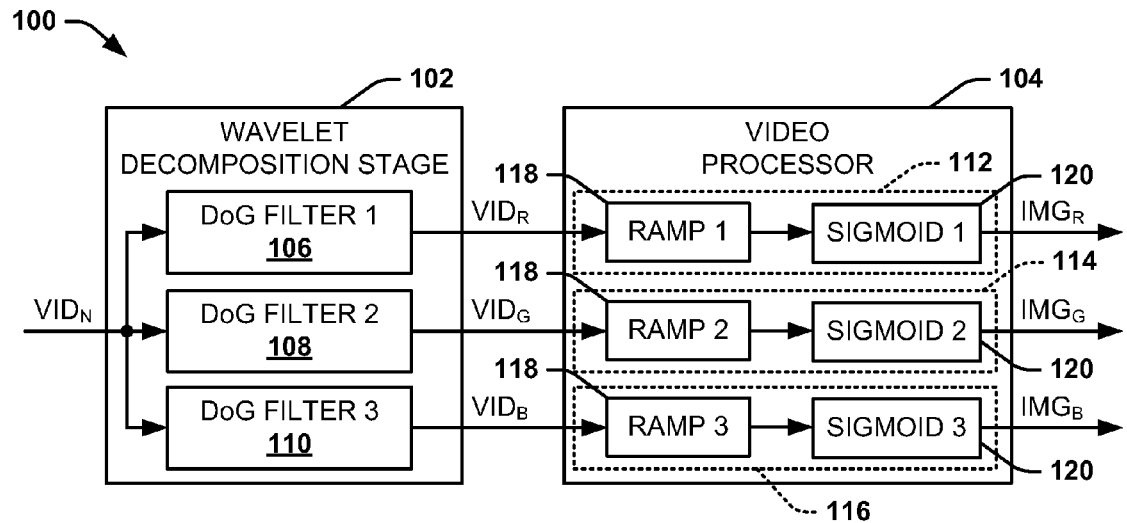
FIG. 3 illustrates an example of an image processing system.

FIG. 3 illustrates an example of an image processing system 100. As an example, the image processing system 100 can correspond to a portion of the image processing system 54 in the example of FIG. 2. Therefore, reference is to be made to the example of FIG. 2 in the following description of the example of FIG. 3.

The image processing system 100 includes a wavelet decomposition stage 102 and a video processor 104. As an example, the wavelet decomposition stage 102 can correspond to the wavelet decomposition stage 62, and thus a portion of the wavelet enhancement component 56, in the example of FIG. 2. The wavelet decomposition stage 102 receives the normalized image frame data VID$_N$, which is provided to each of a first DoG filter 106, a second DoG filter 108, and a third DoG filter 110, that are each part of the wavelet decompositions stage 102. As an example, each of the DoG filters 106, 108, and 110 can be configured as a bandpass filter having different Gaussian dimensions with respect to the image associated with the normalized image frame data VID$_N$.

For example, each of the DoG filters 106, 108, and 110 can have dimensions associated with different dimensions of elliptical axes (e.g., major and minor axes) associated with the respective image frame of the normalized image frame data VID$_N$. Therefore, each of the DoG filters 106, 108, and 110 can correspond to different frequency bands that are associated with different respective levels of detail of the image frame of the normalized image frame data VID$_N$. Thus, each of the DoG filters 106, 108, and 110 can map the image to a different color space signal (e.g., red, green, and blue color space signals). As an example, the first DoG filter 106 can have elliptical Gaussian dimensions that are tuned to provide a high level of detail associated with the image frame, the third DoG filter 110 can have elliptical Gaussian dimensions that are tuned to provide a low level of detail associated with the image frame, and the second DoG filter 108 can have elliptical Gaussian dimensions that are tuned to provide a level of detail associated with the image frame that is between the first and third DoG filters 106 and 110. Each of the DoG filters 106, 108, and 110 provide bandpass filtering of the normalized image frame data VID$_N$ into a different respective frequency band, demonstrated in the example of FIG. 3 as respective signals VID$_R$, VID$_G$, and VID$_B$ (e.g., corresponding, respectively, to RGB color space signals). While the DoG filters 106, 108, and 110 are described in the example of FIG. 3 as being elliptical with respect to dimensions of major and minor axes, it is to be understood that the DoG filters 106, 108, and 110 can instead have dimensions that are associated with other geometries, such as circular radii. Additionally, while each of the DoG filters 106, 108, and 110 are demonstrated in parallel, it is to be understood that the DoG filters 106, 108, and 110 can be arranged in other ways, such as in a cascaded arrangement. As an example, the filter for the blue channel can be a cascade of the filters of the red and green channels.

The wavelet signals VID$_R$, VID$_G$, and VID$_B$ are each provided to the video processor 104. The video processor 104 includes a first non-linear mapping component 112, a second non-linear mapping component 114, and a third non-linear mapping component 116. The mapping components 112, 114, and 116 thus each correspond to the respective DoG filters 106, 108, and 110, and thus the respective wavelet signals VID$_R$, VID$_G$, and VID$_B$. Each of the mapping components 112, 114, and 116 includes a ramp function 118, demonstrated in the example of FIG. 3 as RAMP 1, RAMP 2, and RAMP 3. The ramp functions 118 can each be configured to distribute the image data associated with the respective one of the wavelet processed signals VID$_R$, VID$_G$, and VID$_B$ across the resultant image (e.g., from top to bottom), such as to simulate atmospheric attenuation with respect to the respective frequency band of the color space signal. For example, each of the ramp functions can be configured to add a predetermined set of values to the grayscale values of each of the rows of the image frame corresponding to the respective one of the wavelet signals VID$_R$, VID$_G$, and VID$_B$. As an example, a given ramp value R$_H$ provided by a respective ramp function 118 can be expressed as follows:

$$R_{F1} = d*[(2/(n-1))y - 1] \qquad \text{Equation 3}$$

Where:
y corresponds to a given row of the image frame (e.g., y=0, . . . , n−1);
n corresponds to a total number of rows of the image frame; and
d corresponds to a predetermined variable corresponding to the respective color space associated with the given one of the mapping components 112, 114, and 116 (e.g., red, green, or blue).

As an example, a value of d may be positive, negative, or zero, depending on the color space that is associated with the respective one of the mapping components. Therefore, each of the ramp functions 118 can simulate atmospheric attenuation of each of the separate wavelengths that are represented by the respective wavelet bands VID$_R$, VID$_G$, and VID$_B$ in a different manner in the resultant image signal IMG, such as to simulate the attenuation of atmosphere differently based on the forward-looking characteristic of the video source 12. While Equation 3 is described herein as the manner in which the ramp functions 118 are applied, it is to be understood that other mathematical expressions can be alternatively implemented, such as based on a negative exponential function of row number or negative exponential function of distance to the scene point associated with a pixel.

Each of the ramp functions 118 provides an output to a respective sigmoid component 120 in each of the mapping components 112, 114, and 116. The sigmoid components 120 are each configured to down-convert the respective ramp-processed wavelet signals VID$_R$, VID$_G$, and VID$_B$ to respective portions of the image signal IMG, demonstrated in the example of FIG. 3 as IMG$_R$, IMG$_G$, and IMG$_B$. Collectively, the image signals IMG$_R$, IMG$_G$, and IMG$_B$ can be provided from the video processor 104 as the image signal IMG in the example of FIG. 2. As an example, each of the sigmoid components 120 can be configured substantially similar (e.g., the same) to provide the respective image signals IMG$_R$, IMG$_G$, and IMG$_B$ from the separately ramp-processed wavelet signals VID$_R$, VID$_G$, and VID$_B$. For example, the sigmoid component can be expressed as the following equations to generate an output pixel value y"(x) for each pixel based on a sigmoid function y"(x):

$$y''(x) = 255 * (y'(x) - y'(r))/(y'(s) - y'(r)) \quad \text{Equation 4}$$

$$y'(x) = 255/(1 + \exp(-(u+v))) \quad \text{Equation 5}$$

$$u = -8x/(r-s) \quad \text{Equation 6}$$

$$v = 4*(r+s)/(r-s) \quad \text{Equation 7}$$

Where:
  r is a predetermined lower clipping point value of an input histogram of sequential images;
  s is a predetermined upper clipping point value of the input histogram of sequential images; and
  x is the input gray scale value and y" (x) is the output gray scale value in an 8-bit/pixel/color display example.

By implementing the calculations provided by Equations 4-7, the sigmoid components 120 can effectively non-linearly map each pixel of the ramp-processed wavelet signals $VID_R$, $VID_G$, and $VID_B$ having high dynamic-range floating point values into each pixel of the image signals $IMG_R$, $IMG_G$, and $IMG_B$ as integer pixel values with a lesser bit-width, and thus in a down-converted manner. In the example of Equations 4-7, the resultant image signals $IMG_R$, $IMG_G$, and $IMG_B$ have 8-bit/pixel/color values, such as from floating point values. The image signals $IMG_R$, $IMG_G$, and $IMG_B$ can thus be provided as the image signal IMG corresponding to a visible color image for a given image frame to the video display system 20 to display the visible color image for each given image frame.

The visible color images that are displayed on the video display system 20 can be implemented for a variety of artificial vision purposes. As an example, the artificial vision system 10 can be mounted on a platform, such as a moving platform, to provide artificial vision to assist a pilot of the moving platform (e.g., an aircraft) to navigate in inclement conditions. For example, the artificial vision system 10 can be implemented for navigation assistance in a degraded visual environment (DVE), such as resulting from smoke, snow, dust, or sand. For example, the image processing system described herein (e.g., the image processing system 54 in the example of FIG. 2) can be implemented in the image system described in U.S. patent application Ser. No. 14/041,849, entitled "Platform-Mounted Artificial Vision System", filed on 30 Sep. 2013, which is incorporated herein by reference in its entirety.

Figure 4:
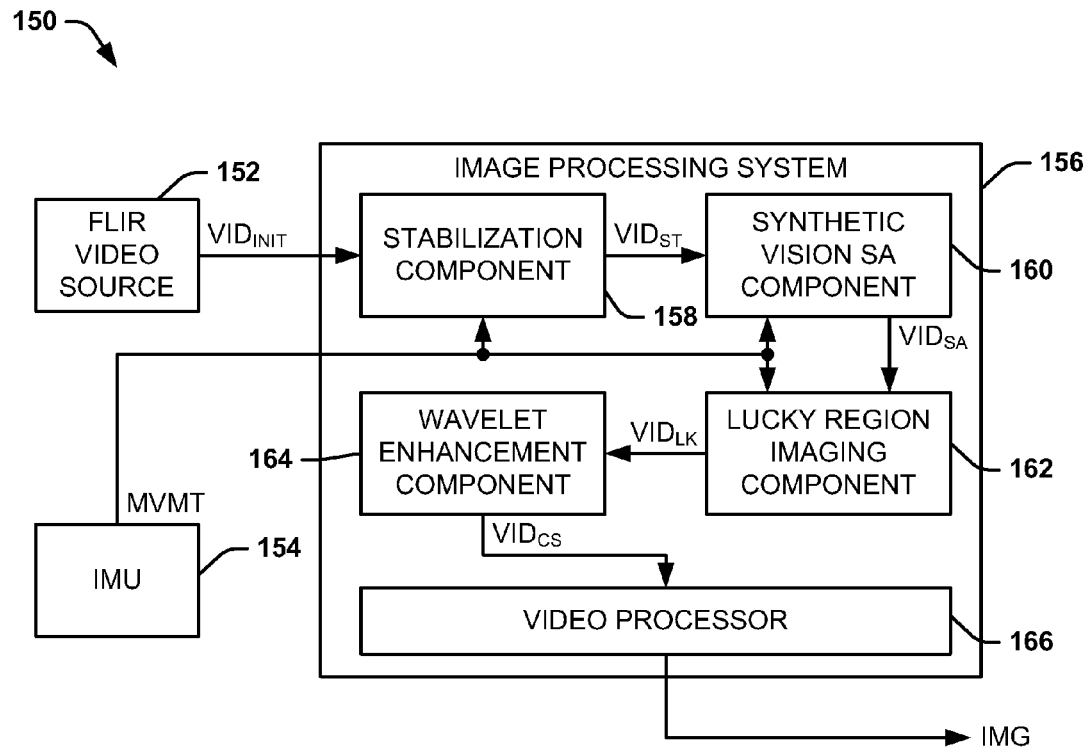
FIG. 4 illustrates another example of an image system.

FIG. 4 illustrates another example of an image system 150. The image system 150 can correspond to the image system 10 in the example of FIG. 1. Therefore, the image system 150 can be implemented as a self-contained unit mounted on a platform, such as a moving platform, to capture sequential frames of an environment scene and provide visible video data IMG to a video display system (e.g., the video display system 20). Thus, the image system 150 can provide artificial vision for a user, such as a pilot of the moving platform. For example, in the case of an unmanned aircraft system, the pilot can be at a remote location.

The image system 150 includes a FLIR video source 152 that is configured to capture a plurality of sequential IR frames of image data of the environment scene. In the example of FIG. 4, the FLIR video source 152 generates image data $VID_{INIT}$ that can correspond to fourteen-bit IR image data provided at sixty frames per second (fps). As an example, the FLIR video source 152 can be configured to implement image pre-processing on the captured IR images, such that the image data $VID_{INIT}$ is pre-processed. For example, the pre-processing of the FLIR video source 152 can include correction of non-uniformity (e.g., based on variability during the fabrication of an associated focal plane array (FPA)) and pixel errors. The image system 150 also includes an IMU 154 that is configured to generate inertial data MVMT associated with motion of the moving platform on which the image system 150 can be mounted (e.g., on one or more locations of a helicopter). The inertial data MVMT generated by the IMU 154 can be associated with movement in six-degrees of motion (e.g., yaw, pitch, roll, and vector motion in three-dimensions) of the FLIR video source 152 based on being included within the self-contained package of the image system 150, such as to provide a more accurate measurement of the movement of the FLIR video source 152 for processing of the image data $VID_{INIT}$.

The image data $VID_{INIT}$ and the inertial data MVMT are each provided to an image processing system 156. The image processing system 156 can be configured as a set of software modules or FPGA code that are executed by one or more processors, such as in a system-on-chip (SOC) arrangement in the self-contained image system 150. In the example of FIG. 4, the image data $VID_{INIT}$ is provided to a stabilization component 158 that is configured to provide video frame stabilization of the image data $VID_{INIT}$ to generate stabilized image data $VID_{ST}$. As an example, the stabilization component 158 can employ a Structure-From-Motion technique to estimate a pose of the video source 152 for each of the sequential frames of the image data $VID_{INIT}$ based on the inertial data MVMT. Once the stabilization component 158 determines a pose of the video source 152, two consecutive IR images can be aligned based on a homography corresponding to a projective transformation that can be applied to render an image from a given pose into the perspective of another pose. As an example, the stabilization component 158 can estimate a homography using robust salient features that are detected within each IR image of the image data $VID_{INIT}$. The computation can utilize inertial data if available. Features that are detected on the current IR image can then be correlated with features detected in the previous image. From this correlation, the homography can be determined to spatially align overlapping pixels in the current IR image to those of the previous IR image. Thus, homography can capture frame-to-frame displacement caused by movement of the platform/video source 152 and/or gimbals pointing angle inaccuracies. The stabilized image data $VID_{ST}$ can thus include a homography between a current frame and one or more (e.g., two) previous frames. As an example, the image processing system 156 can reside within an infrared camera, in a separate chassis, or within a display.

The stabilized image data $VID_{ST}$ is provided to a synthetic vision SA component 160. The synthetic vision SA component 160 is configured to process the stabilized image data $VID_{ST}$ based on the inertial data MVMT to calculate SA data associated with the sequential frames, such as can be implemented to assist in processing of the image data $VID_{ST}$ and/or to assist in navigation and/or pilotage of the moving platform. For example, the synthetic vision SA can include a range map generator, an obstacle detector, and an image overlay component to calculate ranges to objects in a three-dimensional range map by comparing an apparent motion of the objects in the three-dimensional range map based on the known motion of the moving platform as provided by the inertial data MVMT over a given amount of time. In this manner, the location of the obstacles can be determined based on parallax associated with consecutive stabilized images of the stabilized image data $VID_{ST}$ based on the inertial data MVMT. Additionally, the image overlay component can extract a distance to detected obstacles from the passive three-dimensional range map and insert distance data into the stabilized image data $VID_{ST}$, such that the stabilized image data $VID_{ST}$ can be annotated with data associated with the obstacles. For example, the obstacles can be highlighted on the displayed visible images separate from a respective background of the displayed visible images, such as based on having different colors, brightness, text overlays (e.g., displaying information), graphical cues, brownout symbology, and/or other information. Accordingly, as the platform moves in DVE conditions (e.g., brownout), the highlighting and/or other information of the overlaid obstacles can be updated based on the inertial data MVMT and the known range to the obstacles, and can thus be used by the pilot as reference points that would otherwise have been obscured by the DVE conditions.

The image data $VID_{SA}$ and the inertial data MVMT are provided to a lucky region imaging component 162. The lucky region imaging component 162 is configured to enhance the frames of the image data $VID_{SA}$ with respect to environment-based occlusion of the video source 152 based on recursively processing the consecutive stabilized frames of the image data $VID_{SA}$ based on the inertial data MVMT. As an example, the environment-based occlusion of the video source 152 can be a result of the platform being in a DVE, such that the video source 152 can be occluded by sand (i.e., brownout), snow (i.e., whiteout), or a variety of other vision obscuring conditions, or a variety of atmospheric distorting conditions such as turbulence. However, it is to be understood that the image processing system 154 may omit processing by the lucky region imaging component 162 in the absence of DVE conditions, such as for the moving platform (e.g., helicopter) flying in clear weather and/or too high to stir up dust clouds.

The enhanced image data $VID_{LK}$ is provided to a wavelet enhancement component 164, which can correspond to the wavelet enhancement component 56 in the example of FIG. 2. Therefore, similar to as described previously, the wavelet enhancement component 164 is configured to decompose the monochromatic image data $VID_{LK}$ into high spatial frequency, middle spatial frequency, and low spatial frequency bands (e.g., via respective DoG filter). In the example of FIG. 4, the respective spatial frequency bands are demonstrated as image data $VID_{CS}$ corresponding to the separate respective color space signals associated with the separate levels of detail.

The image data $VID_{CS}$ is provided to a video processor 166 that is configured to convert the image data $VID_{CS}$ into data suitable for display as visible images, demonstrated as the visible video data IMG in the example of FIG. 4. As an example, the video processor 166 can correspond to the video processor 58 in the example of FIG. 2. For example, the video processor 166 can be configured to process the respective high spatial frequency, middle spatial frequency, and low spatial frequency bands to provide the image data $VID_{CS}$ in the RGB color space suitable for display on the video display system (e.g., the video display system 20). Therefore, the visible video data IMG can be provided to the video display system 20 as color images. For example, the video processor 166 can down-convert the image data $VID_{CS}$ from having high dynamic-range floating point pixel values to integer pixel values having a lesser bit-width. Accordingly, the pilot of the moving platform can use the enhanced visible images provided via the visible video data IMG to assist in navigating the moving platform. As a result, the pilot or user of the artificial vision system 10 can implement the video display system 20 to assist in viewing a scene or navigating a moving platform in conditions of limited or no naked-eye visibility (e.g., DVE conditions).

Figure 5:
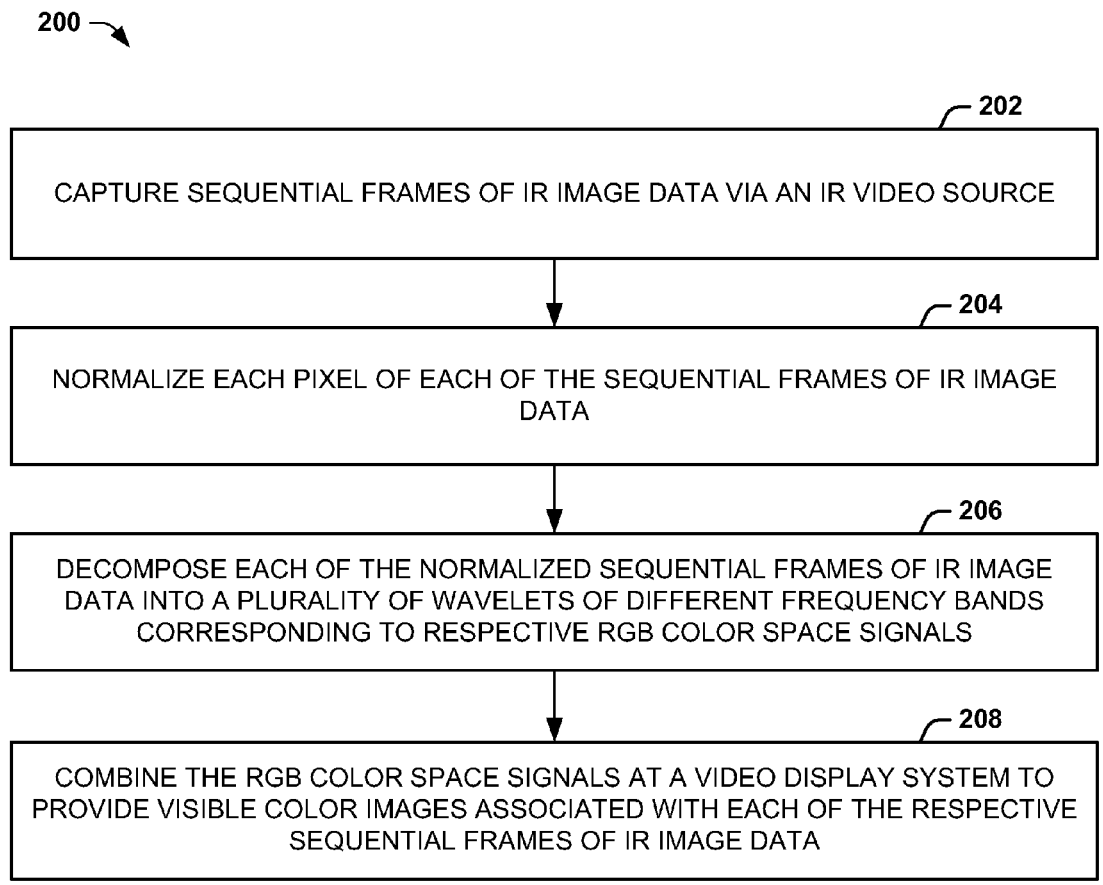
FIG. 5 illustrates an example of a method for converting image data into a visible image in an artificial vision system.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for converting IR image data into a visible image in an artificial vision system. At 202, sequential frames of IR image data (e.g., the image data $VID_{INIT}$) are captured via an IR video source (e.g., the video source 52). At 204, each pixel of each of the sequential frames of IR image data is normalized (e.g., via the pre-processing stage 60). At 206, each of the normalized sequential frames of IR image data is decomposed into a plurality of wavelet frequency bands (e.g., the wavelet bands $VID_R$, $VID_G$, and $VID_B$) corresponding to respective RGB color space signals (e.g., the image signals $IMG_R$, $IMG_G$, and $IMG_B$). At 208, the RGB color space signals are combined at a video display system (e.g., the video display system 20) to provide visible color images associated with each of the respective sequential frames of IR image data.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An artificial vision system comprising:
   an image system comprising a video source that is configured to capture sequential frames of image data of non-visible light and at least one processor configured as an image processing system, the image processing system comprising:
   a wavelet enhancement component comprising a pre-processing stage configured to analyze each of the sequential frames of image data with respect to a dynamic range and distribution of grayscale values, to implement noise suppression to substantially mitigate noise in each of the sequential frames of IR image data based on the analysis, and to provide normalization of each pixel of each of the sequential frames of image data on a row-by-row basis based on the analysis, wherein the wavelet enhancement component further comprises a wavelet decomposition stage configured to decompose the normalized image data into a plurality of wavelet frequency bands; and
   a video processor configured to convert the plurality of wavelet frequency bands in the sequential frames into respective visible color images; and
   a video display system configured to display the visible color images.

2. The system of claim 1, wherein the sequential frames of image data of non-visible light comprise sequential frames of infrared (IR) image data, wherein the video processor is configured to process and down-convert the plurality of wavelet frequency bands in each of the sequential frames to generate respective RGB color space signals that collectively correspond to the visible color images.

3. The system of claim 1, wherein the image processing system comprises a wavelet decomposition stage comprising a plurality of difference-of-Gaussian (DoG) filters configured to decompose the normalized image data into a plurality of wavelet frequency bands that are mapped to respective color space signals.

4. The system of claim 3, wherein each of the plurality of DoG filters is configured to separate the normalized image data into the respective plurality of wavelet bands corresponding to different respective amounts of visual detail associated with each of the sequential frames of image data.

5. The system of claim 1, wherein the image processing system comprises a video processor that comprises a plurality of non-linear mapping components configured to process the respective plurality of wavelet frequency bands as wavelet decomposed imagery in a non-linear manner to generate a respective visible color image.

6. The system of claim 5, wherein each of the plurality of non-linear mapping components comprises a ramp function associated with a row number and which is configured to simulate atmospheric attenuation of the wavelet decomposed imagery differently relative to a ramp function associated with each remaining one of the plurality of non-linear mapping components.

7. The system of claim 5, wherein each of the plurality of non-linear mapping components comprises a sigmoid component configured to down-convert the processed one of the respective plurality of wavelet bands having a first bit-length to the respective one of the separate color space signals having a second bit-length that is less than the first bit-length.

8. The system of claim 7, wherein the wavelet enhancement component is configured to provide each pixel associated with the plurality of wavelet bands at the first bit-length corresponding to a high dynamic range floating point value, such that the sigmoid component is configured to convert each pixel to the second bit-length as an integer value.

9. A navigation assistance system mounted on a platform and comprising the artificial vision system of claim 1, wherein the image system is configured to generate situational awareness (SA) data based on processing the sequential frames and to visibly identify the SA data relative to the platform on the visible color images.

10. A non-transitory computer readable medium configured to store instructions that, when executed by a processor, are configured to implement a method for converting monochromatic infrared (IR) image data into a visible image in an artificial vision system, the method comprising:
  capturing sequential frames of IR image data via an IR video source;
  normalizing each pixel of each of the sequential frames of IR image data;
  decomposing each of the normalized sequential frames of IR image data into a plurality of wavelet frequency bands mapped to respective RGB color space signals by implementing a plurality of difference-of-Gaussian (DoG) filters configured to separate the normalized sequential frames of IR image data into the respective plurality of wavelet bands corresponding to different respective amounts of visual detail associated with each of the plurality of sequential frames of image data; and
  combining the RGB color space signals at a video display system to provide visible color images associated with each of the respective sequential frames of monochromatic IR image data.

11. The method of claim 10, wherein normalizing each pixel of each of the sequential frames of IR image data comprises:
  analyzing each of the sequential frames of monochromatic IR image data with respect to a dynamic range and distribution of grayscale values; and
  normalizing each pixel of each of the sequential frames of image data on a row-by-row basis based on the analysis.

12. The method of claim 11, further comprising implementing a noise suppression algorithm on each of the sequential frames of monochromatic IR image data to substantially mitigate noise based on the analysis.

13. The method of claim 10, further comprising implementing a distinct ramp function associated with a row number for each of the plurality of wavelet bands to simulate atmospheric attenuation of a respective one of the different frequency bands.

14. The method of claim 10, decomposing each of the normalized sequential frames of monochromatic IR image data comprises generating the plurality of wavelet bands as high dynamic range floating point values having a first bit-length, the method further comprising down-converting the plurality of wavelet frequency bands from the first bit-length to the respective RGB color space signals each having a second bit-length associated with an integer value, the second bit-length being less than the first bit-length.

15. An artificial vision system mounted on a moving platform, the system comprising:
  a self-enclosed image system comprising:
    an infrared (IR) video source that is configured to capture a plurality of sequential frames of IR image data;
    at least one processor configured as an image processing system, the image processing system being configured to calculate situational awareness (SA) data based on the processed sequential frames of IR data and comprising:
      a wavelet enhancement component configured to normalize each pixel of each of the sequential frames of IR image data and to decompose the normalized sequential frames of IR image data into a plurality of wavelet frequency bands; and
      a video processor configured to convert the plurality of wavelet frequency bands in the sequential frames of IR image data into respective visible color images; and
  a video display system configured to display the visible color images and to visibly identify the SA data relative to the moving platform on the visible color images.

16. The system of claim 15, wherein the image processing system comprises a pre-processing stage configured to analyze each of the sequential frames of IR image data with respect to a dynamic range and distribution of grayscale values, to implement noise suppression to substantially mitigate noise in each of the sequential frames of IR image data based on the analysis, and to provide the normalization of each pixel of each of the sequential frames of IR image data on a row-by-row basis based on the analysis.

17. The system of claim 15, wherein the image processing system comprises a wavelet decomposition stage comprising a plurality of difference-of-Gaussian (DoG) filters configured to decompose the normalized image data into the plurality of wavelet frequency bands corresponding to different respective amounts of visual detail associated with each of the sequential frames of image data.

18. The system of claim 15, wherein the image processing system comprises a video processor that comprises a plurality of non-linear mapping components, each of the plurality of non-linear mapping components comprising:
- a ramp function configured to simulate atmospheric attenuation of a respective one of the respective plurality of wavelet frequency bands differently relative to a ramp function associated with each remaining one of the plurality of non-linear mapping components; and
- a sigmoid component configured to convert a processed one of the respective plurality of wavelet bands having a first bit-length associated with a high dynamic range floating point value to the respective one of the separate color space signals having a second bit-length associated with an integer value, wherein the second bit-length is less than the first bit-length.

* * * * *